Oct. 18, 1960 E. A. FERRIS ET AL 2,956,655
ONE-WAY CLUTCH
Original Filed Dec. 17, 1954
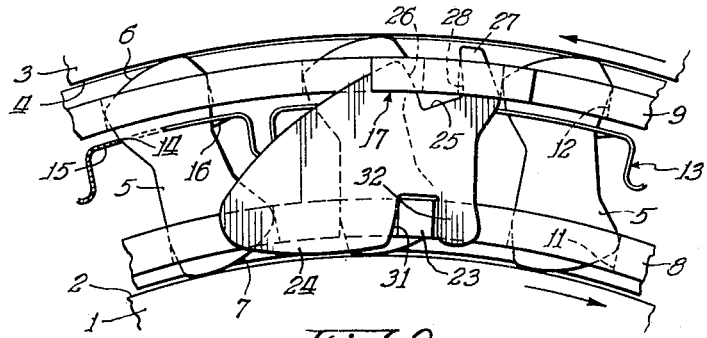
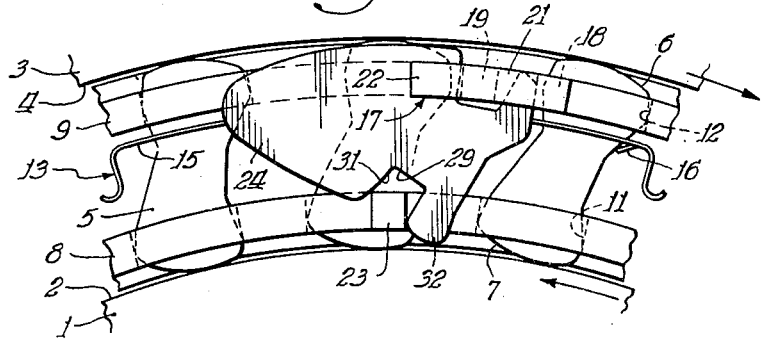
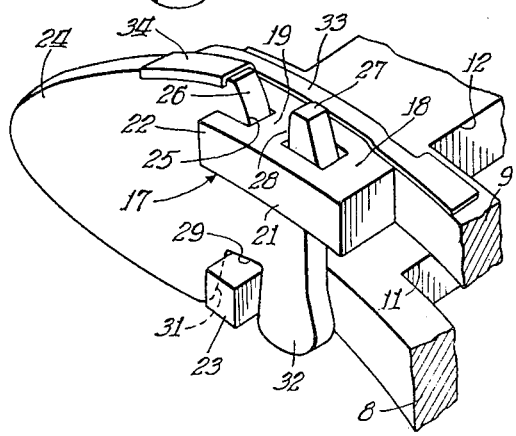
Inventors:
Ernest A. Ferris and
Bertram A. Fulton
By: Frank R. Thiengort Atty.

United States Patent Office 2,956,655
Patented Oct. 18, 1960

2,956,655

ONE-WAY CLUTCH

Ernest A. Ferris, Elmhurst, and Bertram A. Fulton, Glen Ellyn, Ill., assignors to Borg-Warner Corporation, Chicago, Ill., a corporation of Illinois Original application Dec. 17, 1954, Ser. No. 476,032, now Patent No. 2,917,145, dated Dec. 15, 1959. Divided and this application June 1, 1959, Ser. No. 822,705

2 Claims. (Cl. 192—45.1)

This invention relates to one-way engaging devices, and more particularly to one-way engaging devices incorporating sprags or grippers disposed between a pair of races, the grippers being spaced apart and controlled by a pair of radially spaced and relatively movable cages, means being provided either to disengage the sprags completely from one of the races under certain conditions or to hold the sprags in engagement with the races under said conditions.

This application is a division of our co-pending application Serial No. 476.032, filed December 17, 1954, now Patent No. 2,917,145, granted December 15, 1959.

In certain installations substantial wear is experienced in sprag clutches during their overrunning conditions at excessive speed in which the freewheel drag of the sprags against one of the races results in abnormal and undesirable wear of the sprags and the race surfaces. It is, therefore, desirable to lift the sprags from engagement with one of the races during these high speed overrunning conditions to eliminate this wear.

In order to accomplish this purpose, it has been found to be particularly desirable to employ a sprag clutch incorporating a plurality of sprags which extend through suitable openings in a pair of radially spaced and relatively rotatable cages, the openings closely receiving the sprags, one or more centrifugally responsive weights being positioned axially of the cages to effect relative rotation therebetween upon the attainment of undesirable high speed conditions, whereupon the cages—by such relative movement—effect lifting of the sprags from one of the race surfaces.

It is, therefore, one object of the present invention to provide an improved one-way engaging device incorporating sprags and a pair of radially spaced and relatively rotatable cages having openings receiving the sprags, in which means are provided to effect relative rotation of the cages in a predetermined direction in response to the speed of rotation of the unit to move the sprags away from one of the races, or to hold the sprags in engagement therewith.

Another object of the present invention is to provide a device in accordance with the preceding object in which one or more weights are suitably positioned axially of the cages, the weights being so constructed and arranged as to effect relative rotation between the cages upon the attainment of high speeds in the unit whereby the sprags are lifted from one of the races.

Another object of the present invention is the provision of a device in accordance with the preceding objects in which elongated, centrifugally responsive weight means are mounted between suitable camming surfaces on the inner and outer cages, and in which spring means are provided to bias the centrifugally responsive weights against movement in a direction to effect lifting of the sprags from the races.

Another object of the present invention is an improved one-way engaging device incorporating sprags which extend through and are closely received by suitable openings in a pair of relatively rotatable and radially spaced cages, in which weight means are mounted laterally of the cages and by suitable means attached to certain of the sprags whereby movement of the weight means in response to centrifugal force effects movement of the sprags atttached thereto and consequent movement of the cages so that all of the sprags are lifted free of one of the race surfaces.

Other objects and features of the present invention will be readily apparent to those skilled in the art in the specification and appended drawings illustrating certain preferred embodiments in which:

Figure 1 is a partial view in side elevation of a one-way engaging device incorporating the principles of the present invention;

Figure 2 is a view similar to Figure 1 showing the parts in a moved position;

Figure 3 is a perspective view of the portions of the structure illustrated in Figures 1 and 2.

Referring now to the form of the present invention illustrated particularly in Figures 1 through 3, there is illustrated therein a one-way engaging device comprising an inner race 1 having an annular surface 2 to be engaged by the sprags, and an outer race 3 having an annular surface 4 to be engaged by the sprags, surfaces 2 and 4 together defining a circumferential opening. Disposed between the annular surfaces 2 and 4 are a plurality of longitudinally spaced sprags 5 each of which is provided with radially spaced, race-engaging surfaces 6 and 7, which are curved about spaced centers so that attempted relative rotation of the races in the direction of the arrows in Figure 1 effects movement of the sprags to the position illustrated therein and thereby effects a wedging engagement of the sprags 5 between the races 1 and 3 which are thereby connected together for unitary rotation. Rotation of the sprags to the disengaged position, illustrated in Figure 2, by virtue of relative race rotation in the direction indicated by the arrows in that figure results in the sprags permitting free relative rotation of the races in that direction.

Means are provided for spacing and effecting substantially common angular movement of the sprags 5 which comprise an inner annular cage 8 and an outer annular cage 9. The inner cage 8 is provided with a plurality of circumferentially spaced openings 11 through which the sprags 5 extend to engage the inner race 1. The outer cage 9 is provided with a plurality of circumferentially spaced openings 12 through which the outer ends of the sprags 5 extend to engage the outer race 3. The dimensions of the sprags 5, and the dimensions of openings 11 and 12, are such that movement of the sprags 5 from the engaged position of Figure 1 to the disengaged position of Figure 2, and vice versa, results in relative rotation of the cages 8 and 9. These dimensions are also such that the sprags 5 are, throughout this range of tilting movement, substantially always in contact with the sides of the openings 11 and 12 through which they extend, with only a bearing clearance between the sprags and the sides of the cooperating openings existing. This results in substantially common angular movement of each and every one of the sprags throughout the operating range of the device.

In order to bias the sprags toward the position in which they wedgingly engage the races 1 and 3, there is also provided an energizing spring 13 of annular form, preferably fabricated of a suitable resilient sheet metal material. The spring 13 is provided with a plurality of openings 14 therethrough, through which the sprags 5 extend. Each of the openings 14 is formed in part by substantially straight, axially extending sides 15, and opposed thereto is a resilient tab 16, integral with the spring 13, which engages the associated sprag to bias it into engaging position with the opposed side 15 and toward engaging position with the races.

The particular one-way engaging device heretofore described is more completely described and claimed in the United States patent to Harry P. Troendly et al. No. 2,824,636, issued February 25. 1958, and entitled "One-Way Clutch."

The outer cage 9 is provided with a plurality of camming extensions 17 integral therewith and projecting axially from the cage 9, the extensions 17 being spaced circumferentially in symmetrical relationship upon the cage 9. Each extension 17 comprises arms 18 and 19 projecting perpendicularly in an outward direction from the cage 9, and an arm 21 connecting the arms 18 and 19 extending generally parallel to the sides of cage 9. The arm 21 has the portion 22 which extends beyond the arm 19 as may be seen clearly in Figure 3.

The cage 8 is provided with a plurality of lugs 23, extending perpendicularly therefrom in an axial direction, and disposed about the cage 8 in symmetrical circumferential relationship so as to correspond to the extensions 17 on the cage 9.

Mounted upon the sides of the cages 8 and 9, respectively, in association with a lug 23 and an extension 17, are a plurality of centrifugally responsive weights 24. Each of the weights 24 has its center of gravity so disposed that it tends to move from the position illustrated in Figure 1 toward the position illustrated in Figure 2 in response to the centrifugal force resulting from rotation of the device during overrunning. Each of the weights 24 is constructed so as to have an upper opening 25 therein defined by a surface 26 and an integral leg 27. As best illustrated in Figure 3, the legs 27 of each of the weights 24 extend between arms 18 and 19 of the cooperating extension 17 on the cage 9, while the portion 22 of the arm 21 extends parallel to and outwardly of the outer surface of the weight 24 to maintain it in position. Each of the arms 27 is provided with a cam surface 28 constructed and arranged to engage the arm 18 of the extension 17 in response to movement of the weight 24 under the action of the centrifugal force as will be more fully described hereinafter. Each of the weights is also provided with a lower opening or notch 29 therethrough which is defined by a surface 31 and a leg 32 integral with the weight 24. The opening 29 is adapted to receive lugs 23 extending from the cages 8.

The operation of the device will now be explained. When attempted relative rotation between the races 1 and 3 occurs which is in the direction indicated by the arrows in Figure 1, sprags 5 move to wedgingly connect the races 1 and 3 so that they will rotate together in unison. Upon rotation of the races in the relative direction illustrated in Figure 2, the sprags will move from the position shown in Figure 1 to that in Figure 2. This is freewheeling or overrunning condition of the device. When the outer race rotates very rapidly, for example, in this freewheeling condition, the centrifugal force operating upon the weights 24 will effect their rotation in a generally clockwise direction, as viewed in Figure 2. Under these conditions, the cam surface 28 on the arm 27 of the weight 24 engages the arm 18 of extension 17 on the outer cage 9 so as to tend to rotate the cage 9 in a clockwise direction as viewed in Figures 1 and 2. Simultaneously, the inner surface of the leg 32 on the weight 24 engages the associated lug 23 on the inner cage 8 to tend to move that cage counterclockwise as viewed in Figures 1 through 3. As a result of this relative movement of the cages, the sprags 5 which, as previously indicated, are closely received in the openings 11 and 12 of the cages 8 and 9, respectively, are rotated against the bias of spring 13 in a generally clockwise direction—as viewed in Figures 1 and 2—so as to be lifted free from engagement with the inner race 2. Under such conditions, the wear on the sprags 5 and inner race 1 usually experienced in high speed overrunning conditions is eliminated. Upon reduction of the speed of the outer race, the centrifugal force operative upon the weights 24 is reduced. The tabs 16 on the spring 13, constantly in engagement with sprags 5, will effect movement of the sprags back into engagement with the race 1, which will move the outer cage 9 in a counterclockwise direction as viewed in Figure 2 and the inner cage 8 clockwise as viewed in that figure. As a result, the weights 24 will be rotated by virtue of the lugs 23 and the arms 18 and 19 in a counterclockwise direction and the sprags will once again engage both the races so as to be instantly ready to wedgingly engage therebetween when the relative direction of rotation between the races is that indicated by the arrows in Figure 1.

If desired, a leaf spring 33 may be provided on the cage 9 in association with each of the weights 24. Such a leaf spring may be mounted to the cage by any suitable means (not shown), the spring 33 provided with an integral arm portion 34 overlying the radially outwardly facing surface of the weight 24. Upon movement of the weights 24 in response to centrifugal force as aforementioned, both the springs 33 and 13 operate against this movement. It will be obvious that the springs 13 and 33 will also, under such circumstances, tend to return the weights 24 to their normal position when the centrifugal force is no longer operative.

It will, therefore, be seen that the present invention provides one-way engaging devices of the sprag type in which weight means are provided adjacent the pair of radially spaced cages, the weight means effecting movement of the cages relative to each other in a direction to cause disengagement of the sprags from one of the races upon the occurrence of high speed overrunning condition. Inasmuch as all the sprags substantially fill the openings in the radially spaced cages, movement of one of the cages is operative to effect movement of all of the sprags employed so that the lifting of all of the sprags from the races is both readily and surely accomplished.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a one-way engaging device adapted for use between a pair of races, an inner cage, an outer cage, means defining a plurality of circumferentially spaced openings in said cages, a plurality of sprags respectively extending through an opening in said inner cage and through an opening in said outer cage, means defining race engaging surfaces on said sprags constructed and arranged to wedgingly engage said sprags between said races upon relative rotation therebetween in one direction whereby said races rotate in unison and to permit relative rotation therebetween in the opposite direction, means biasing said sprags toward engagement with said races, means constructed and arranged to disconnect said sprags from one of said races during predetermined overrunning conditions of said device comprising elongated weight means mounted axially of said cages in engagement with both of said cages adapted to effect relative rotation therebetween during said predetermined conditions, and spring means in engagement with said weight means adapted to bias said weight means against its centrifugally responsive movement.

2. In a one-way engaging device adapted for use between a pair of races, an inner cage, an outer cage, means defining a plurality of circumferentially spaced openings in said cages, a plurality of sprags respectively extending through an opening in said inner cage and through an opening in said outer cage, means defining race engaging surfaces on said sprags constructed and arranged to wedgingly engage said sprags between said races upon relative rotation therebetween in one direction whereby said races rotate together in unison and to permit relative rotation therebetween in the opposite direction, means biasing said sprags towards engagement with said races, means constructed and arranged to disconnect said sprag from one of said races during predetermined overrunning conditions of said device comprising elongated weight means mounted axially of said cages in engagement with both of said cages adapted to effect relative rotation therebetween during said predetermined conditions, said cages being provided with integral axially extending extensions adapted to carry said elongated weight means, and spring means on said outer cage adapted to engage said elongated weight means to bias said weight means against centrifugally responsive movement during said predetermined overrunning conditions.

No references cited.